United States Patent [19]
Siebold

[11] 3,782,406
[45] Jan. 1, 1974

[54] FLUID SEPARATOR

[75] Inventor: Howard E. Siebold, Libertyville, Ill.

[73] Assignee: Liquid Controls Corporation, Chicago, Ill.

[22] Filed: May 18, 1972

[21] Appl. No.: 254,415

[52] U.S. Cl............. 137/202, 137/411, 251/DIG. 2
[51] Int. Cl........................ F16k 1/14, F16k 31/18
[58] Field of Search..................... 137/92, 202, 409, 137/411, 416, 421, 424, 425, 429, 432; 4/56–60; 73/322.5; 251/DIG. 2

[56] References Cited
UNITED STATES PATENTS

| 3,259,142 | 7/1966 | Richards............................. 137/202 |
| 2,675,025 | 4/1954 | Wynkoop....................... 137/625.12 |
| 1,928,130 | 9/1933 | Kauffman............................. 4/57 R |
| 3,060,960 | 10/1962 | Waterfill......................... 25/DIG. 2 |
| 212,556 | 2/1879 | Johnson......................... 137/625.12 |
| 2,180,173 | 11/1939 | Share............................. 251/DIG. 2 |
| 3,428,078 | 2/1969 | Christopher................... 73/322.5 X |
| 3,153,247 | 10/1964 | Walsh....................................... 4/58 |

Primary Examiner—Martin P. Schwadron
Assistant Examiner—D. R. Matthews
Attorney—Raymond E. Fidler et al.

[57] ABSTRACT

A float actuable valve mounted in an accumulator chamber includes a flexible, imperforate strip connected at one end adjacent a valve seat and at the other end to a swingable back-up shoe which is connected by a linkage to the float.

7 Claims, 5 Drawing Figures

PATENTED JAN 1 1974  3,782,406
SHEET 2 OF 2
FIG. 3
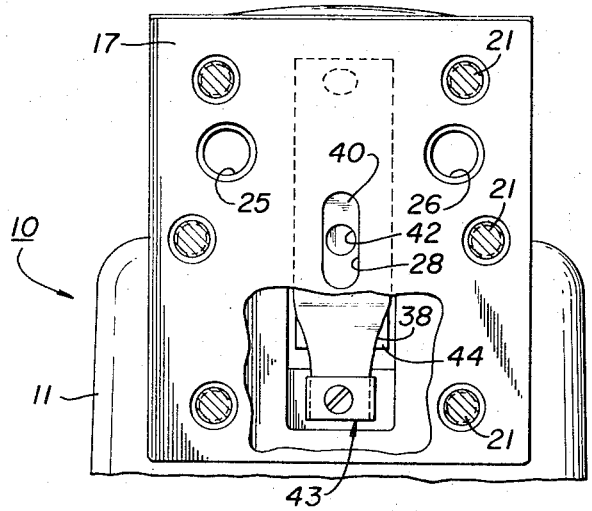
FIG. 4
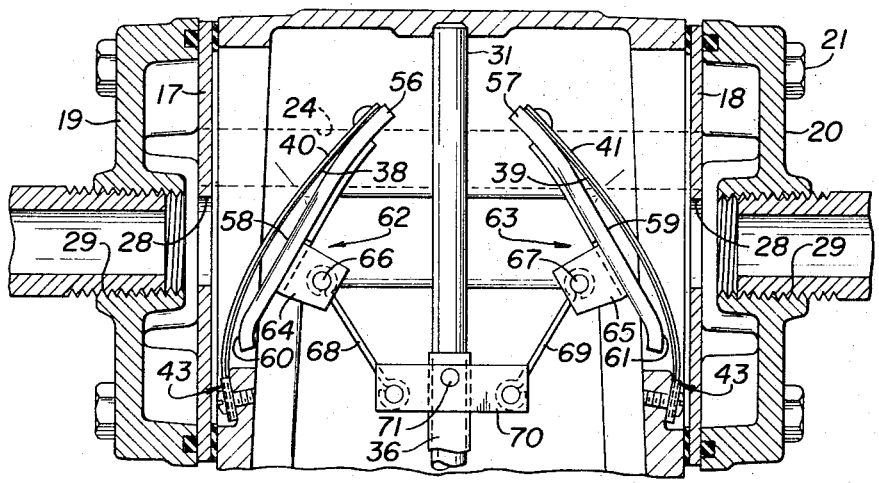
FIG. 5

3,782,406

FLUID SEPARATOR

The present invention relates in general to valve mechanisms, and it relates in particular to valve mechanisms particularly suited for use in fluid separators functioning as air eliminators or liquid seqregators.

BACKGROUND OF THE INVENTION

Valves used in such devices must be operable throughout a wide range of pressures such as are encountered in gravity feed systems as well as in high pressure pumping systems and must be actuable by the relatively low forces exerted thereon by a small float. Poppet valves have been employed in the past for this purpose but they are expensive to manufacture and do not operate entirely satisfactory in high pressure applications. U.S. Pat. No. 3,021,861 discloses a balanced type of valve using U-shaped reeds as the valve elements, which valve is inherently better in operation than the poppet valves of the prior art but is still expensive to manufacture.

OBJECTS OF THE INVENTION

An object of the present invention is, therefore, to provide a new and improved valve.

Another object of the present invention is to provide a new and improved fluid separator.

A further object of the present invention is to provide a new and improved valve which is operable under relatively high pressure differentials by a relatively low actuating force.

A still further object of the present invention is to provide a new and improved air eliminator for use in liquid metering systems.

SUMMARY OF THE INVENTION

Briefly, the above and further objects may be realized in accordance with the present invention by providing a valve mechanism including a reed-like valve member connected at one end below the associated valve seat and connected at the other end to a shoe which is in turn connected by a linkage to the float. As the float sinks, the shoe swings away from the valve seat and carries the reed out of valving engagement with the seat. As the float rises, the shoe swings toward the seat to carry the reed into valving engagement over the valve port, with the floatation force being amplified through the linkage to hold the reed in the closed, sealing position. A porous mass carried by the float retains liquid for a sufficient time after the float sinks in the chamber to temporarily increase the weight of the float to provide a greater opening force on the valve.

BRIEF DESCRIPTION OF THE DRAWINGS

Further objects and advantages and a better understanding of the invention may be had from the following detailed description taken in connection with the accompanying drawings, wherein:

FIG. 3 is a sectional view taken along the line 3—3 of FIG. 2, a portion of the valve seat being broken away to show the shape of the valve reed;

FIG. 4 is a sectional view of the upper portion of a different embodiment of the present invention, the valve mechanism in an open position; and FIG. 5 is a view similar to that of FIG. 4 showing the valve mechanism in a closed position.

DETAILED DESCRIPTION OF THE DRAWINGS

Figure 1:
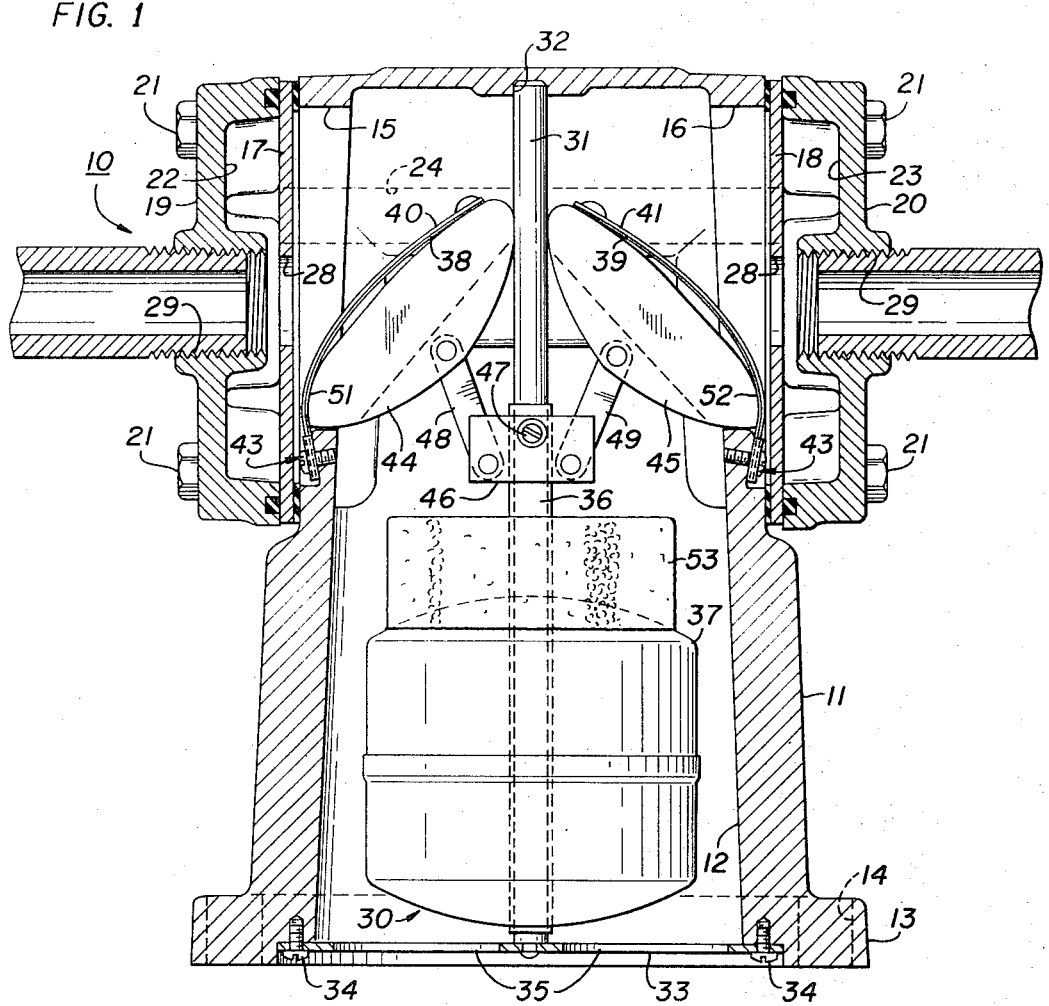
FIG. 1 is a vertically sectioned view of an air eliminator embodying certain aspects of the present invention, the device being shown in an air eliminating, valve open position.
Figure 2:
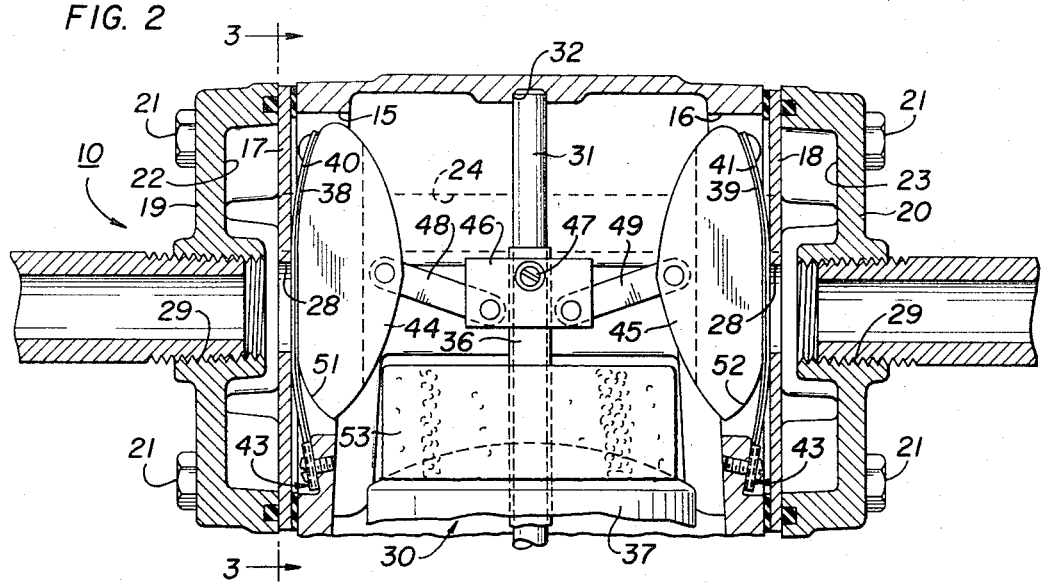
FIG. 2 is a view of the upper portion of the upper portion of the air eliminator of FIG. 1 showing the valve mechanism in a closed position.

Referring now to the drawings and particularly to FIGS. 1, 2 and 3, there is illustrated an air eliminator 10 including a housing 11 enclosing a float chamber 12 which is open at the bottom for communication with a liquid carrying line from which air or other gaseous material is to be removed. A mounting flange 13 suitably apertured as at 14 for receiving mounting bolts is provided at the bottom of the housing 11, and a pair of diametrically opposite openings 15 and 16 are provided in the housing 11 near the top thereof. A pair of identically shaped valve plates 17 and 18 are respectively mounted over the side openings 15 and 16 and held in place by means of cover members 19 and 20 secured to the housing by means of a plurality of bolts 21. A plurality of suitable gaskets are disposed between the valve plates, the housing and the covers to hermetically seal the upper portion of the float chamber from the ambient. The covers 19 and 20 are recessed to define with the valve plates 17 and 18 a pair of chambers 22 and 23 which are permanently interconnected by a pair of passageways 24 provided in the walls of the housing 11 and correspondingly located holes 25 and 26 in the valve plates 17 and 18.

As best shown in FIG. 3, the valve plates each have an elongated valve port 28 located opposite to an outlet port 29 in the associated cover member. The outlet ports 29 are internally threaded to receiving suitable tubing members connecting to other parts of the overall system in which the air eliminator 10 is to be used.

In order to mount a float 30 within the float chamber 12 there is provided a vertically disposed guide stem 31 on which the float 30 is slidably mounted for movement between a lowermost position as shown in FIG. 1 and an uppermost position as shown in FIG. 2. As shown, the float 30 includes a tubular member 36 slidably mounted on the stem 31 and a hollow ball-like buoyant part 37 sealed to the tubular member 36. The upper end of the guide stem 31 is positioned in a cylindrical recess 32 in the top wall of the housing 11, and the bottom of the stem 31 is secured to a circular mounting plate 33 fastened to the housing 11 by means of a plurality of machine screws 34. A plurality of large openings 35 in the plate 33 permit the free flow of fluid to and from the chamber 12 through the bottom thereof.

The valve mechanism of the present invention includes a pair of thin, elongated, reed-like, imperforate, flexible strips 38 and 39 which are fixedly connected at their lower ends to respective locations on the inner wall of the housing 11 directly below the valve ports 28. Mounted over the reeds 38 and 39 are a pair of resilient gasket strips 40 and 41 which are separate from the reeds and include circular apertures 42 (FIG. 3) which are aligned with the centers of the valve ports 28 when the valve mechanism is in a closed position as shown in FIG. 2. Considered more particularly, the lower ends of the reeds 38 and 39 and the strips 40 and 41 are fastened to the housing 11 by means of a pair of bracket and screw assemblies 43. The upper ends of the reeds 38 and 39 and the overlying strips 40 and 41 are respectively fastened to a pair of back-up shoes 44 and 45 near the upper ends thereof. The back-up shoes 44 and 45 may be blocks formed of a rigid plastic material.

In order to move the shoes 44 and 45 between the open and closed position, a linkage including a member 46 pivotally connected to the tubular member 36 by a pintle 47 and a pair of linkage arms 48 and 49 is connected between the float and the shoes. The links 48 and 49 are connected to the shoes on pivot axes located above the pivot axes on which the links are connected to the member 46, and the lengths of the links are selected so that upward movement of the float assembly provides an increasing closing force on the shoes 44 and 45 while a downward movement of the float causes an increasing opening force on the shoes 44 and 45. The lower end face portions 51 and 52 of the shoes are curved to provide smoothly acting valves and to prevent excessive wear of the reeds. As shown in FIG. 3, the reeds are inwardly tapered near the bottom to reduce the biasing force exerted on the shoes toward the closed positions while providing a sufficiently large valving area in the vicinity of the valve ports 28.

In accordance with another feature of the present invention a porous member 53 of annular configuration is mounted over the tubular member 36 and rests against the top of the float member 37. The purpose of the member 53 is to increase the opening force on the valve members when the liquid level in the float chamber falls without substantially decreasing the closing force on the valve mechanism when the liquid level rises. When the liquid level is normal and the valve is closed, the porous member 53 is submerged in liquid whereby the weight of liquid carried thereby is balanced by the pressure of the liquid adjacent thereto in the chamber. When, however, the liquid level falls below the top of the member 53, the liquid held in the pores thereof does not immediately flow out and thus temporarily increases the weight of the float. The liquid does, however, gradually drain out of the pores when the liquid level is below the top thereof. When the member 53 is free of liquid the weight of the float is merely increased by the weight of the member 53. It has been found that a member 53 formed of open pore polyurethane foam having a pore size of eighty pores per inch operates satisfactorily for aqueous and petroleum liquids. For other liquids which may attack polyurethane different materials should be used.

OPERATION

When the line on which the air eliminator 10 is mounted is first opened and liquid begins to flow therethrough, the float assembly is in the lowermost position as shown in FIG. 1 and the air and other gases or the like are exhausted through the open valve ports 28. As the air becomes exhausted the float assembly rises causing the shoes 44 and 45 and th reeds 38 and 39 to swing outwardly toward the valve plates 17 and 18. The reeds and the separate gasket strips thus progressively move over the valve ports 28 from top to bottom until the valve ports are completely closed and further elevation of the float is prevented. With the valve ports closed the liquid level may rise above the ports as the gas collected in the upper portion of the float chamber 12 is compressed under line pressure. Hence, the porous member 53 is completely submerged and the pores thereof fill up with liquid. During normal operation gas gradually accumulates in the top of the float chamber causing the liquid level to fall. When the liquid level falls below the upper surface of the member 53 the effective weight of the float assembly begins to increase by virtue of the liquid held in the member 53 above the liquid level. When the liquid falls to a predetermined level the shoes 44 and 45 begin to swing away from the valve seats to peel the reeds and the resilient strips away from the valve plates to progressively open the valve ports from the top to permit the accumulated gases to escape. Where, however, large quantities of gas are suddenly encountered and the liquid level abruptly falls, the float assembly also drops quickly to promptly open the valves. The added weight of the liquid temporarily held by the porous member 53 decreases the opening time of the valves under such conditions.

Refer now to FIGS. 4 and 5 wherein is illustrated another valving mechanism embodying the present invention similar to that of FIGS. 1–3 and wherein like parts are identified by the same reference members. As there shown, the valve reeds 38 and 39 are fastened near the upper ends to respective back-up shoes 56 and 57 which are formed of metal and have central planar portions 58 and 59 and curved lower portions 60 and 61. A pair of brackets 62 and 63 are welded to the rear sides of the shoes and have pairs of ears 64 and 65 holding rods 66 and 67 on which link arms 68 and 69 are respectively mounted for free pivotal movement. The lower ends of the arms 68 and 69, which may be formed of stiff wire, are pivotally connected to opposite end portions of a plate 70 at locations lower than a pivot connection 71 provided between the plate 70 and the tube 36.

In operation the valve mechanism of FIGS. 4 and 5 is the same as that of FIGS. 1–3 with the shoes and valve reeds being swung open and closed positions relative to the valve plates 17 and 18 as the float assembly moves up and down in the float chamber.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

I claim:
1. A fluid separator, comprising
   casing means defining a chamber,
   a valve face on said casing means having a port therein opening into said chamber,
   an actuator movable in said chamber along an axis parallel to said valve face,
   a back-up shoe having a planar surface portion and an adjacent curved portion,
2. A fluid separator according to claim 1 wherein said pivotable connection means comprises
   a link arm pivotally connected to said back-up shoe and pivotally connected to said actuator, said arm providing the sole connection of said actuator to said shoe.
3. A fluid separator according to claim 2 wherein
   the locations where said link arm is pivotally connected to said back-up shoe and said actuator are positioned to provide an over center linkage which tends to move said actuator in the valve opening direction in response to an internally directed force on said strip member through said port.

4. A fluid separator according to claim 1 wherein said strip member is inwardly tapered toward said other end to reduce the biasing force exerted on said shoe toward the valve closing position.

5. A fluid separator according to claim 1 wherein said actuator comprises
a float movable along said axis in said chamber, and
a porous member carried by said float for immersion in liquid disposed in said chamber.

6. A fluid separator comprising
a casing defining a float chamber,
a valve member movable between a closed position over said port and an open position remote from said port,
a float movable in said casing and connected to said valve member for actuation thereof, and
a porous member carried by said float for immersion in liquid disposed in said chamber,
said porous member being an open cell foam having pores of sufficient size to permit liquid contained therein to gradually flow out of said pores under the force of gravity when the liquid level in said chamber falls below said porous member,
whereby liquid absorbed by said porous member temporarily increases the weight of said float when the liquid level in said chamber falls below said porous member.

7. A fluid separator according to claim 6 wherein said porous means is mounted at the top of said float.

* * * * *

UNITED STATES PATENT OFFICE
CERTIFICATE OF CORRECTION

Patent No. 3,782,406      Dated January 1, 1974

Inventor(s) HOWARD E. SIEBOLD

It is certified that error appears in the above-identified patent and that said Letters Patent are hereby corrected as shown below:

Patent Claim 1:
    The last 14 lines of the claim appearing on page 2 of the Amendment filed on June 25, 1973 is omitted from the patent. Claim 1 is as follows.

1. A fluid separator, comprising
casing means defining a chamber,
a valve face on said casing means having a port therein
    opening into said chamber,
an actuator movable in said chamber along an axis parallel
    to said valve face,
a back-up shoe having a planar surface portion and an
    adjacent curved portion,
an imperforate resilient strip member connected near one
    of its ends to said back-up shoe and extending
    across said planar and curved portions thereof,
said strip member being connected near its other end to
    said casing in proximity to said valve face, and
pivotal connecting means connected between said actuator
    and said back-up shoe for swinging said shoe
    and said strip member relative to said face to
    open and close said port,
said planar surface portion of said shoe exerting a lateral
    closing force on said strip toward said valve face
    over said port when said strip overlies said port.

Patent claim 6, column 6, line 6, "gradually" should be
--gradually--

Signed and sealed this 29th day of October 1974.

(SEAL)
Attest:

McCOY M. GIBSON JR.
Attesting Officer

C. MARSHALL DANN
Commissioner of Patents